Patented Aug. 2, 1932

1,870,214

UNITED STATES PATENT OFFICE

HANS AICKELIN AND FRITZ TELLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PURIFICATION OF ALUMINUM CHLORIDE SOLUTIONS

No Drawing. Application filed December 16, 1930, Serial No. 502,851, and in Germany December 19, 1929.

The present invention relates to the extraction of ferric chloride from aluminum chloride solutions containing the same.

In many organic syntheses large amounts of aqueous aluminum chloride solutions contaminated with iron chloride are obtained as waste products which can be turned to value only after the elimination of the iron chloride.

We have now found that the iron chloride is readily extracted from aqueous solutions of aluminum chloride by intimately mixing the said solutions of a concentration corresponding to at least 30 grams of aluminum oxide ($Al_2O_3$) in each kilogram of the solution and in which the iron is present in the form of unhydrolyzed ferric chloride, with oxygen containing organic solvents boiling above 50° C. difficultly soluble in water, and separating the organic solvent which has taken up the ferric chloride. It is essential for the purpose of our invention that the ferric chloride is present in unhydrolyzed form which may be ensured by the addition of up to about 10 per cent of a strong mineral acid. Such addition, however, is not necessary when the concentration of the aluminum chloride is higher than corresponds to a content of 55 grams of aluminum oxide in each kilogram of the solution. Preferably the aluminum chloride solutions are used in as highly concentrated form as possible from which aluminum chloride may even crystallize out, since the higher the concentration the smaller is the solubility of the organic solvents therein, so that when employing highly concentrated solutions, the loss of solvent is reduced to a minimum.

If the iron in the aluminum chloride solutions is present in the divalent form it must be oxidized to the trivalent form in any known and suitable manner before extraction.

The extraction may be carried out at any temperature and may therefore directly follow the concentration.

As already pointed out oxygen containing organic solvents boiling above 50° C. and preferably above 100° C. and difficultly soluble in water are suitable for the extraction according to our invention. Such solvents comprise higher alcohols, aldehydes, ketones and esters. As examples of such solvents may be mentioned butyl alcohols, amyl alcohols, butyl formate, butylacetate, in particular benzyl alcohol, benzaldehyde, allyl carbinol, cyclohexanol formate, cyclohexanol, methylcyclohexanol, cyclohexanone and methylcyclohexanone.

The solvents which have taken up the ferric chloride are separated from the aluminum chloride solution by any customary method and may be freed from the ferric chloride by simply washing them with water and may then be reused in the process. By the employment of two connected washing towers in which the ferric chloride is extracted from the aluminum chloride solutions by means of the organic solvent and the ferric chloride is again extracted from the solvent alternately, the process can be carried out in a continuous manner. In order to ensure complete removal of the ferric chloride and at the same time reducing the amount of solvent, the aluminum chloride solutions may be extracted several times with restricted amounts of solvent in a cascade process whereby the aluminum chloride solutions already once or several times extracted are brought into contact with fresh solvent or solvent which has only taken up small amounts of ferric chloride. Such cascade process may also be carried in a continuous manner in several washing towers connected with each other.

The definition of the solvents as being difficultly soluble in water is meant to include such solvents as separate from the aluminum chloride solutions, and since the preferred method of freeing the solvents employed from ferric chloride consists in washing the solvents with water, preferably such solvents are employed the solubility of which in water is at the most 10 per cent, as with solvents of a higher solubility the losses of solvents would become too large. The losses occurring in washing the solvents with water may be reduced by adding common salt to the wash-water since such addition reduces the solubility of the solvents.

The following examples will further illustrate the nature of this invention but the invention is not restricted to these examples. The parts are by weight.

Example 1

An aluminum chloride waste liquor contaminated with ferric chloride is evaporated until each kilogram contains an amount of aluminum chloride corresponding to about 128 grams of aluminum oxide, the ferric chloride content then corresponds to about 2.8 grams of ferric oxide ($Fe_2O_3$). The concentrated solution is then extracted three times with an amount of methylcyclohexanone in each case corresponding to 265 grams for each kilogram of the liquid. The extracted solution contains only 0.025 parts of ferric oxide for each 100 parts of aluminum oxide.

Example 2

500 parts of an aluminum chloride solution of a concentration corresponding to 123.6 grams of aluminum oxide and 4.3 grams of ferric oxide in each kilogram are extracted at between 20° and 25° C. first with 200 parts and then with 100 parts of cyclohexanone. More than 99 per cent of the iron content is removed.

By extracting in the same manner an aluminum chloride solution of a concentration corresponding to 61.8 grams of aluminum oxide and 2.19 grams of ferric oxide in each kilogram the iron present is removed to between 90 and 95 per cent.

In an aluminum chloride solution of a concentration corresponding to 30.9 grams of aluminum oxide and 1.08 grams of ferric oxide in each kilogram of the liquid, the ferric chloride is hydrolyzed. The hydrolyzation is removed by the addition of 2 parts of concentrated hydrochloric acid for each 100 parts of the liquid. The aluminum chloride solution is then extracted in the before described manner whereby the ferric chloride is removed to over 97 per cent.

Example 3

An aluminum chloride waste liquor is concentrated to an aluminum chloride content corresponding to 115 grams of aluminum oxide in each kilogram of the liquid which then contains ferric chloride in an amount corresponding to 7.4 grams of ferric oxide in each kilogram. The liquid is then extracted at an initial temperature of about 80° C. first with 400 parts, then with 300 parts and finally with 200 parts of cyclohexanone for each 1000 parts of the liquid. The final temperature of the aluminum chloride solution is between 45° and 50° C. The ferric chloride is practically completely removed.

Any solvent which may be retained in solution by the aluminum chloride solution, may be expelled therefrom by heating or by introducing steam.

What we claim is:—

1. A process of removing iron compounds from aluminum chloride solutions, which comprises intimately mixing an aqueous aluminum chloride solution of a concentration corresponding to at least 30 grams of aluminum oxide in each kilogram of the liquid, in which the iron is present in the form of unhydrolyzed ferric chloride, with oxygen-containing organic solvents boiling above 100° C. and difficultly soluble in water, and separating the organic solvent from the aluminum chloride solution.

2. A process of removing iron compounds from aluminum chloride solutions, which comprises intimately mixing an aqueous aluminum chloride solution of a concentration corresponding to at least 55 grams of aluminum oxide in each kilogram of the liquid and containing ferric chloride, with oxygen-containing organic solvents boiling above 100° C. and difficultly soluble in water, and separating the organic solvent from the aluminum chloride solution.

3. In the process claimed in claim 1, the step which comprises extracting the ferric chloride from the organic solvent by washing with water and reusing the recovered organic solvent in the process.

4. A process of removing iron compounds from aluminum chloride solutions, which comprises intimately mixing an aqueous aluminum chloride solution of a concentration corresponding to at least 30 grams of aluminum oxide in each kilogram of the liquid, in which the iron is present in the form of unhydrolyzed ferric chloride, with cyclohexanone, and separating the organic solvent from the aluminum chloride solution.

5. A process of removing iron compounds from aluminum chloride solutions, which comprises intimately mixing an aqueous aluminum chloride solution of a concentration corresponding to at least 30 grams of aluminum oxide in each kilogram of the liquid, in which the iron is present in the form of unhydrolyzed ferric chloride, with methylcyclohexanone, and separating the organic solvent from the aluminum chloride solution.

6. A process of removing iron compounds from aluminum chloride solutions, which comprises intimately mixing an aqueous aluminum chloride solution of a concentration corresponding to at least 30 grams of aluminum oxide in each kilogram of the liquid, in which the iron is present in the form of unhydrolyzed ferric chloride, with benzyl alcohol, and separating the organic solvent from the aluminum chloride solution.

In testimony whereof we have hereunto set our hands.

HANS AICKELIN.
FRITZ TELLER.